United States Patent [19]

Hosoi et al.

[11] Patent Number: 5,720,494
[45] Date of Patent: Feb. 24, 1998

[54] STEERING WHEEL WITH AIR BAG DEVICE

[75] Inventors: Akio Hosoi; Atsushi Nagata; Katsunobu Sakane, all of Aichi, Japan

[73] Assignee: Toyoda Gosei Co., Ltd., Aichi, Japan

[21] Appl. No.: 768,857

[22] Filed: Dec. 17, 1996

[30] Foreign Application Priority Data

Dec. 27, 1995 [JP] Japan ................... 7-340729
Feb. 26, 1996 [JP] Japan ................... 8-038239

[51] Int. Cl.$^6$ ................... B60R 21/22
[52] U.S. Cl. ................... 280/731; 280/728.2
[58] Field of Search ................... 280/731, 728.2, 280/728.1; 74/552

[56] References Cited

U.S. PATENT DOCUMENTS

| | | | |
|---|---|---|---|
| 4,627,307 | 12/1986 | Yamazawa et al. | 74/552 |
| 5,090,731 | 2/1992 | Fujita et al. | 280/777 |
| 5,243,877 | 9/1993 | Numata | 74/552 |
| 5,356,173 | 10/1994 | Hongou et al. | 280/728.2 |
| 5,615,910 | 4/1997 | Margetak et al. | 280/731 |

FOREIGN PATENT DOCUMENTS

| | | | |
|---|---|---|---|
| 2-133955 | 7/1990 | Japan . | |
| 5105015 | 4/1993 | Japan | 280/731 |
| 2242871 | 10/1991 | United Kingdom | 280/731 |

*Primary Examiner*—Christopher P. Ellis
*Attorney, Agent, or Firm*—Cushman Darby & Cushman, IP Group of Pillsbury Madison & Sutro LLP

[57] ABSTRACT

A steering wheel main body comprises cover members for covering a metal ring core and metal spoke cores, respectively, and a pad which is formed integrally with such cover members. A boss is connected through a connecting part with the metal spoke cores, which are arranged on opposite sides of the steering wheel and formed into a united body. The boss is situated below the metal ring core and the metal spoke cores are connected to the boss and to the other metal spoke core through sub-connecting parts to thereby form an opening, and the air bag device is mounted through the opening. This permits completion of the assembling operation of the steering wheel with ease. After completion of the assembling of the steering wheel, the boss is united together with the steering wheel main body and that completed assembly is mounted onto the top end portion of a steering shaft.

10 Claims, 8 Drawing Sheets

STEERING WHEEL WITH AIR BAG DEVICE

BACKGROUND OF THE INVENTION

1. Field of the Invention

The present invention relates to a steering wheel with an air bag device, and especially to a steering wheel in which assembly efficiency can be improved together with a more stable air bag device.

2. Description of the Related Art

A steering wheel includes an annular ring, a pad disposed in the central portion of the ring, and two or more spokes respectively extending from the ring. A metal core is embedded in the ring and core metals are also respectively embedded in the spokes. In such cases, the metal cores, in both the ring and spokes, are respectively covered with polyurethane foam or the like cover members. Also, below the pad, the leading end portions of the metal spoke cores are connected to a boss plate, hereafter referenced as a boss. This boss is normally mounted on the leading end portion of a steering shaft in such a manner that it is fastened with a nut.

In a steering wheel structured in this manner, not only the metal spoke cores but also the boss formed integrally with a steering wheel main body are mounted on the steeling shaft by fastening them with a nut, an air bag device and the like are mounted on the metal spoke cores and the boss, and the pad is then mounted on the air bag device.

On the other hand, in recent years, there has been proposed a steering wheel in which the boundary lines between the cover members and pad are eliminated by forming them integrally with each other (for example, Japanese Utility Model Publication No. Hei. 2- 133955). According to this steering wheel, the integral formation of the cover members and pad can improve the design of the steering wheel.

As described above, in the steering wheel in which the cover members and pad are formed integrally with each other, the design thereof can be improved and, at the same time, the outer appearance of the steering wheel can be diversified. However, when the steering wheel is assembled, there arises the following problem. That is, in the above-mentioned steering wheel, since the air bag device cannot be mounted from above or from the bottom of the cover members for covering the metal ring core and metal spoke cores, it is necessary to have previously separated the boss from the metal spoke cores.

Therefore, in the above-mentioned conventional technique, the steering wheel comprises a steering wheel main body including the spoke metal cores, the boss, and the air bag device, and these three parts must be assembled to one another. For this reason, the assembling operation is quite complicated, and operationability can be adversely affected.

Also, since the boss must be connected to the spoke metal cores with high reliability, there is required a further complicated operation.

Generally a bag holder, which holds and fixes an air bag and its inflator, is structured such that the peripheral side wall portion thereof is fixed to a rib extending downwardly from the pad with a rivet or the like, thereby stabilizing the operation of the air bag device when the air bag is inflated.

According to the above-mentioned steering wheel in which the cover members and pad are formed integrally with each other, when mounting the air bag device onto the steering wheel, it is difficult to fix the periphery of the bag holder to the rib of the pad with a rivet. For this reason, the periphery of the bag holder is not fixed by any means, or, as disclosed in the above-mentioned utility model publication, the upper portion of the periphery of the bag holder is simply contacted with the rib.

In the inflated state of the air bag of the above-mentioned steering wheel, there is a fear that, when it receives a stress from the air bag, the bag holder can be deformed easily in an outward direction thereof. Therefore, when the air bag is in an inflated state, there is a fear that the air bag can escape in the lateral direction thereof through a clearance generated due to the deformed bag holder. That is, there arises a possibility that the operation stability of the air bag device can be impaired.

SUMMARY OF THE INVENTION

The present invention aims at eliminating the above problems found in the conventional technique. Accordingly, it is an object of the present invention to provide a steering wheel in which cover members respectively for covering the metal ring core and the metal spoke cores are formed integrally with a pad. The steering wheel also includes an air bag device, the assembly operation of which is improved and its operation stability is also improved.

According to a first aspect of the invention, the steering wheel, that includes an air bag device, has a boss to be fixed to a steering shaft and a metal ring core. A first metal spoke core is directly connected to the ring core and to the boss through a connecting part. A second metal spoke core is not connected to the boss. A sub-connecting part, connects together the first and second metal spoke cores. A cover member is provided to cover the boss, the metal ring core, the first and second spoke part core metals and the sub-connecting part. A pad is situated substantially in a central upper portion of the ring and integrally formed with the cover member. An opening is defined by the boss, the connecting part and the sub-connecting part and an air bag device is mounted on the boss so as to be inserted from the opening.

According to a second aspect of the invention, the steering wheel with an air bag device comprises a boss, to be fixed to a steering shaft; a metal ring core and at least two metal spoke cores which are connected to the boss and ring core. A metal core connecting part connects the metal spoke cores. A cover member is provided to cover the boss, the metal ring core, the metal spoke cores and the core metal connecting part. A pad is situated substantially in a central upper portion of the ring and integrally formed with the cover member. The air bag device is mounted on the boss and includes an air bag and an inflator for supporting and fixing the air bag. The core metal connecting part prevents the bag holder from being deformed upon inflation of the air bag.

Here, in the description of the present specification, the vertical direction of the steering wheel refers to the direction extending along the axial direction of the steering shaft and, therefore, it does not always mean the vertical direction of the steering wheel when the steering wheel is mounted in a vehicle.

According to the first aspect of the present invention, the boss is structured such that it is situated downwardly of both the metal ring core and the metal spoke cores, and at least the metal spoke cores are connected to the boss are connected to the other metal spoke cores by means of a sub-connecting part. The air bag device is inserted through an opening which is defined by the boss, the connecting part and the sub-connecting part, whereby the air bag device can be interposed between the pad and boss. That is, according to the invention, simply by fixing the air bag device through an opening which is formed in the steering wheel main body with a relatively wide area, the assembly operation of the steering wheel can be easily completed.

Therefore, according to a first aspect of the invention, there is provided a steering wheel structured such that the cover members, respectively for covering the metal ring core and the metal spoke cores are formed integrally with the pad. The steering wheel also includes an air bag device which is efficiently assembled with component parts of the steering wheel.

According to the second aspect of the invention, when a given deceleration is detected, the air bag is inflated and the pad is spread out. In this case, as the air bag is inflated, the bag holder receives a given stress from the expending air bag. However, according to the present invention, due to the fact that the core metal connecting parts, (the sub-connecting part or the like) for connecting together the metal spoke cores, are provided and also that the bag holder can be supported by the core metal connecting parts when the air bag is inflated, the deformation of the bag holder can be minimized to thereby prevent the air bag from escaping therefrom in a lateral direction. This assures a stabilized spreading-out of the pad as well as the desired inflation of the air bag.

Further, in the steering wheel according to the first aspect of the invention, when the core metal connecting part is provided adjacent to and outside of a portion of the bag holder which gives the largest displacement amount when the air bag is inflated, it becomes possible to minimize the deformation of the bag holder still further, so that the above-mentioned operation can be further positively performed.

Therefore, according to the second aspect of the present invention, in a steering wheel which is structured such that cover members, respectively, for covering the ring core and the metal spoke cores are formed integrally with the pad, and also includes an air bag device, the operation stability of the air bag device can be improved further to achieve excellent effects of the entire combined structure.

Other objects, features, and characteristics of the invention will become apparent upon consideration of the following description and the appended claims with reference to the accompany drawings, all of which form a part of this specification.

DETAILED DESCRIPTION OF THE PREFERRED EMBODIMENTS

Now, description will be given below in detail of an embodiment of a steering wheel according to the present invention with reference to the accompanying drawings.

As shown in these drawings, the steering wheel W comprises a steering wheel main body 1 which includes an annular ring 2, a pad 3 disposed in the central portion of the ring 2, and three spokes 4 respectively extending from the ring 2. Also, ring 2 comprises a metal ring core 5 formed of a steel pipe or the like and a cover member 7a for covering the metal ring core 5. The spoke parts 4 respectively comprises metal spoke cores 6A, 6B, 6C, each of which is formed of a light die-cast metal such as aluminum alloy or the like. A cover member 7b covers the three metal spoke cores 6A–6C. The cover members 7a, 7b and pad 3 are formed of a soft synthetic resin material, such as polyurethane foam, in a united or integral body. The steering wheel main body 1 is assembled and fixed to a boss 8. The structure for assembling the steering wheel main body 1 will be discussed later in detail.

A storage recess 11 is formed below the pad 3, which is enclosed by the cover member 7b. In the storage recess 11 are disposed a membrane switch (not shown) and an air bag device 13. The membrane switch includes two upper and lower thin plates which form part of a conventional horn switch circuit (not shown). Accordingly, if the pad 3 is pressed, the two thin plates are brought into contact with each other, so that a horn can be actuated.

Figure 2:
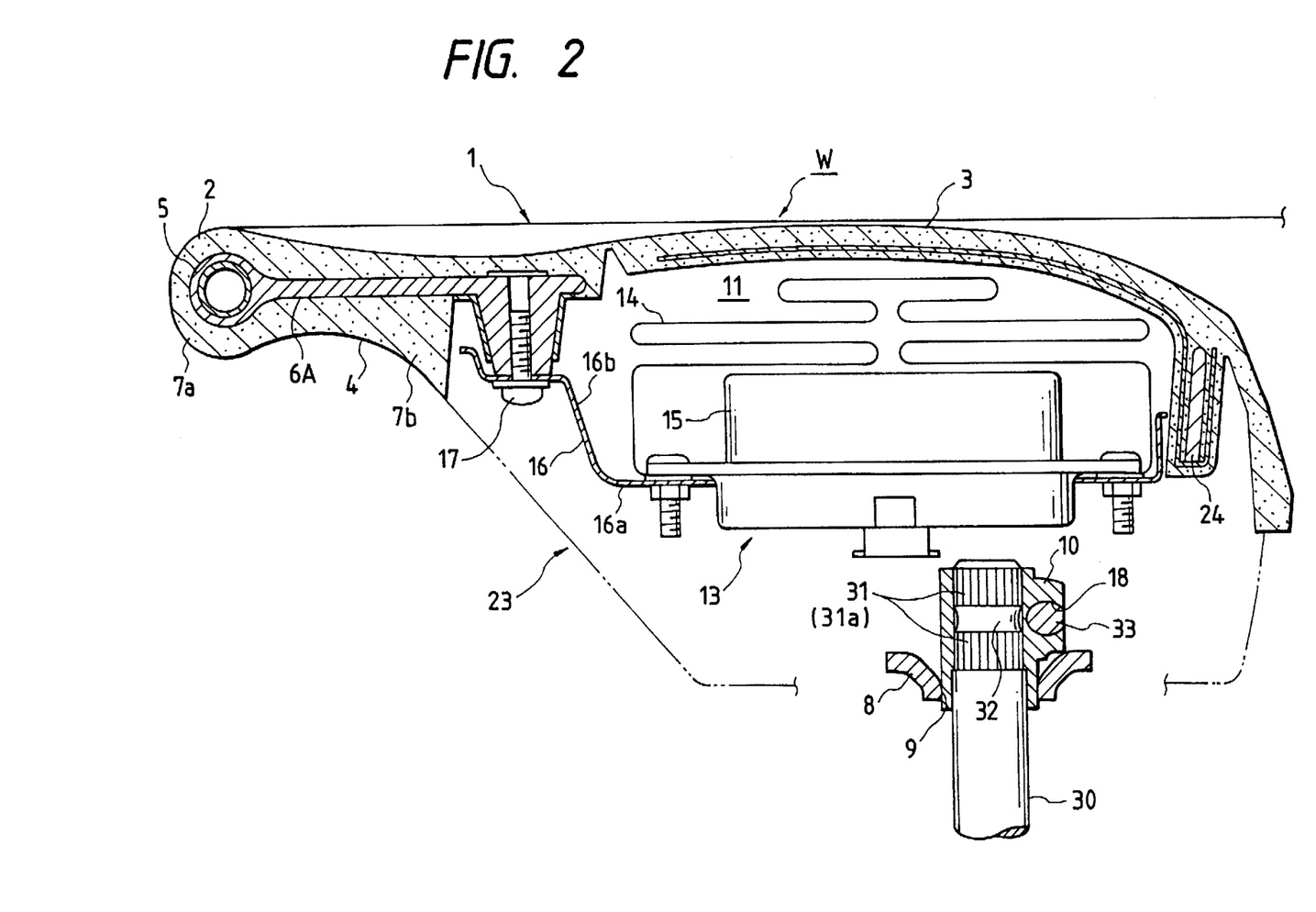
FIG. 2 is a sectional view taken along the line B—B shown in FIG. 3.
Figure 3:
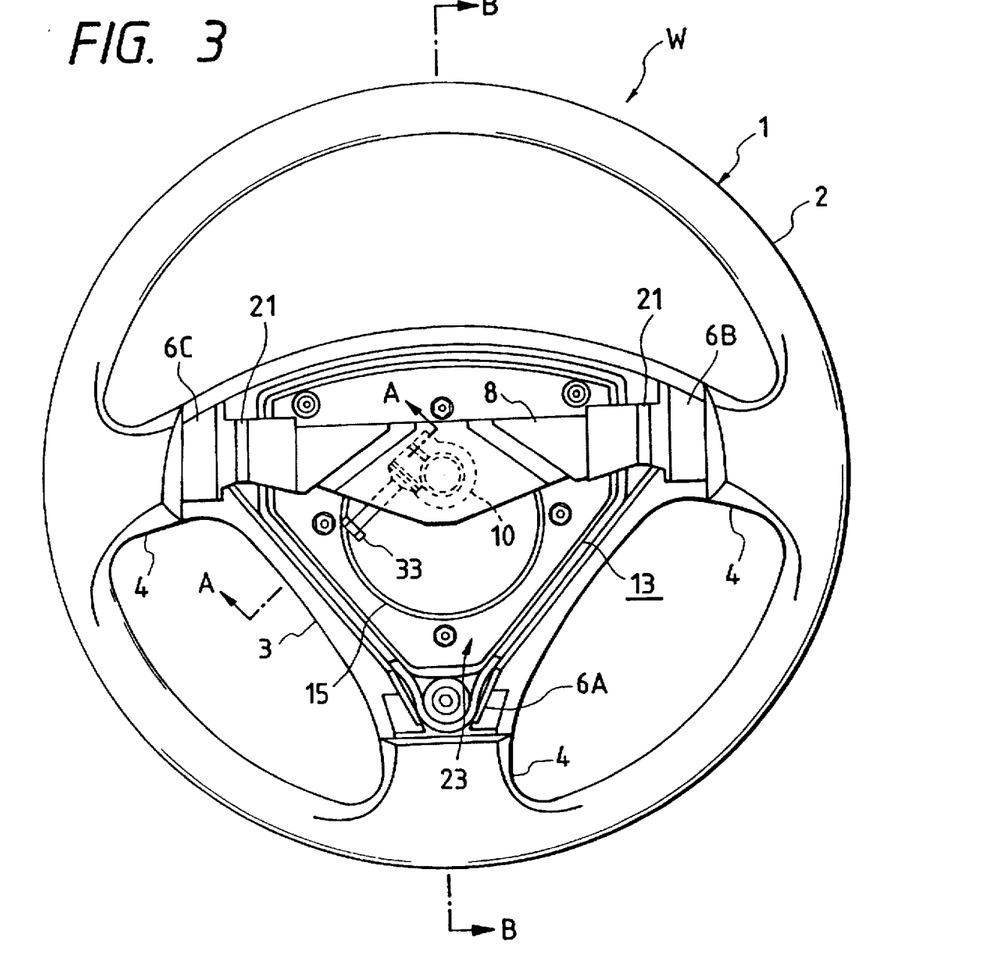
FIG. 3 is a rear view of a steering wheel.

The air bag device 13 includes a bag-like air bag 14 that is stored in a folded manner, an inflator 15 for supplying gas for inflation to the air bag 14, and a bag holder 16 for holding and fixing the air bag 14 and inflator 15. The bag holder 16, as shown in FIG. 2, is fixed by a screw 17 to the metal spoke core 6A. The method for fixing the bag holder 16 to the metal spoke core will be described later.

Also, the bag holder 16 according to the present embodiment is mainly comprised of an annular plate 16a having an opening formed in the central portion thereof for storing the inflator 15, and a cylindrical portion 16b formed integrally with the outer peripheral edge of the plate 16a and extending upwardly therefrom.

Next, description will be given below of the details of the structure of the steering wheel W.

Figure 6:
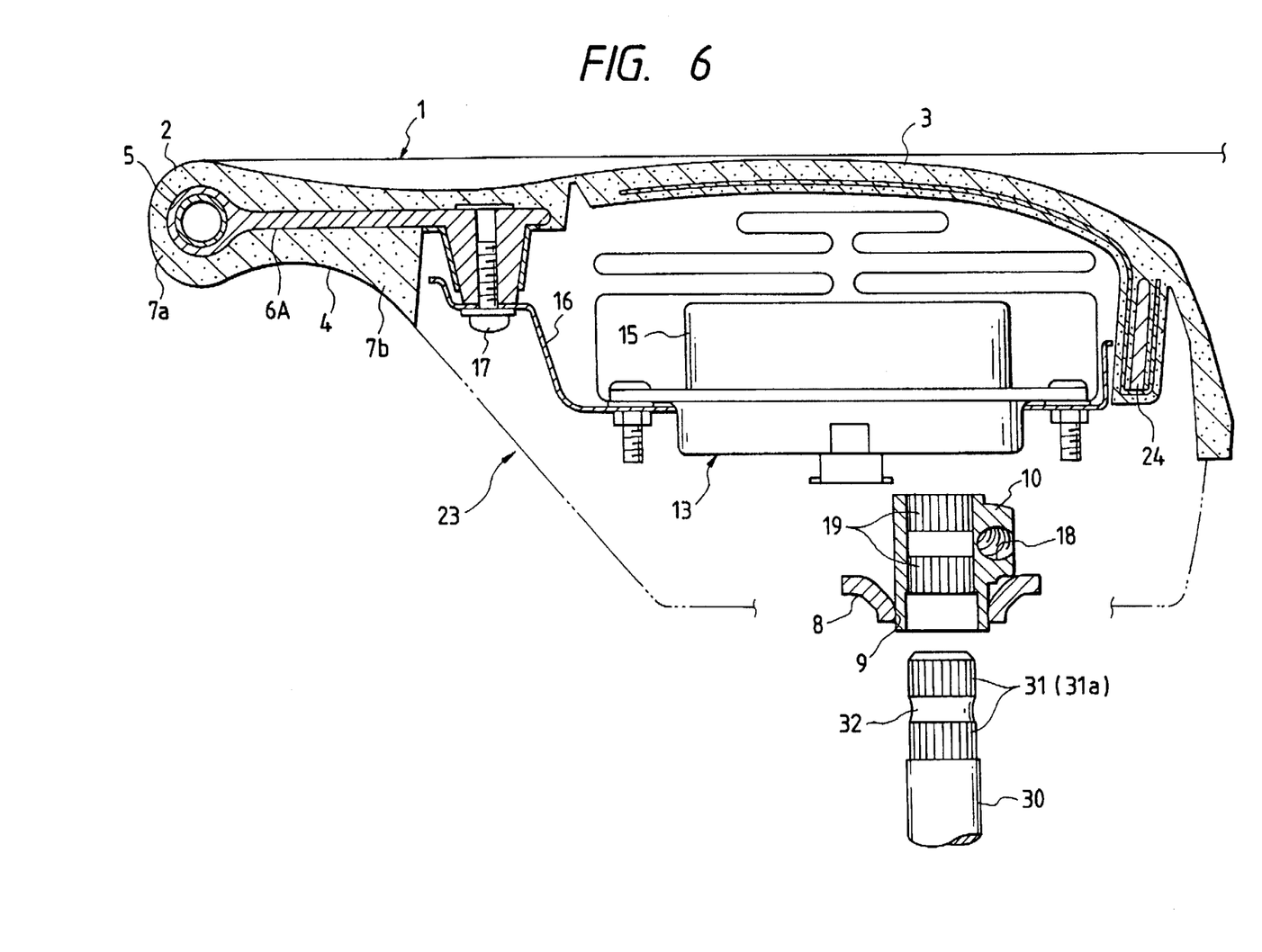
FIG. 6 is a sectional view of the steering wheel and a steering shaft showing the mounting operation for connecting the steering wheel onto the steering shaft.

At first, description will be given of a structure for mounting or assembling the boss 8. As shown in FIG. 6, in the top end portion of a steering shaft 30, there are formed two serrated portions 31 and, in the central or intermediate portion of the serrated portions 31, in the vertical direction thereof, there is formed an annular groove 32. In each of the two serrated portions 31 of the steering shaft 30, there are formed a given number of teeth 31a, generally about 30 pieces. Also, in the central portion of the boss 8, there is formed a through hole 9 and an adapter 10, formed of steel, is inserted into and welded to the inner periphery of the through hole 9.

Figure 4:
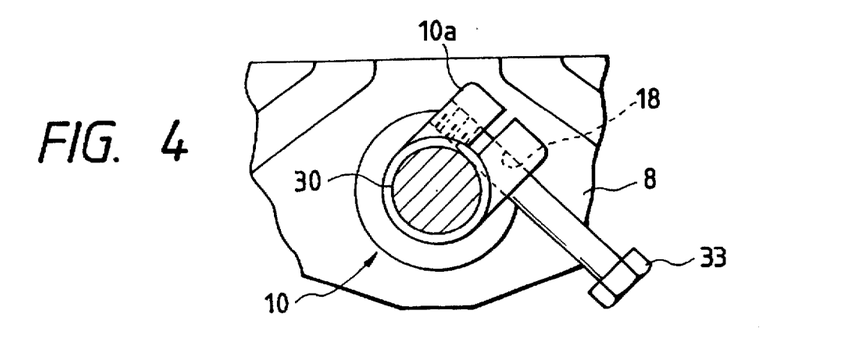
FIG. 4 is a plane section view of an adapter employed in the steering wheel.

This adapter 10 is structured such that the lower portion thereof is formed in a substantially cylindrical shape and the adaptor 10 has a yoke portion 10a at the upper portion thereof so as to be formed in a substantially C shape when it is viewed from top as in FIG. 4. A bolt hole 18, having a female screw, is formed adjacent the top end portion of the yoke portion 10a. Further, on the inner peripheral surface of the adapter 10, there are formed two serrated portions 19 which correspond to the two serrated portions 31 of the steering shaft 30, respectively. The adapter 10 is fitted with the top end portion of the steering shaft 30 while the serrated portions 19 mesh with the serrated portion 31. Also, a tapered bolt 33 is fastened to the bolt hole 18 in such a manner that part of the tapered bolt 33 is inserted into the annular groove 32. Due to this, not only the adapter 10 but also the boss 8 are strongly fixed to the top end of steering shaft 30.

Figure 1:
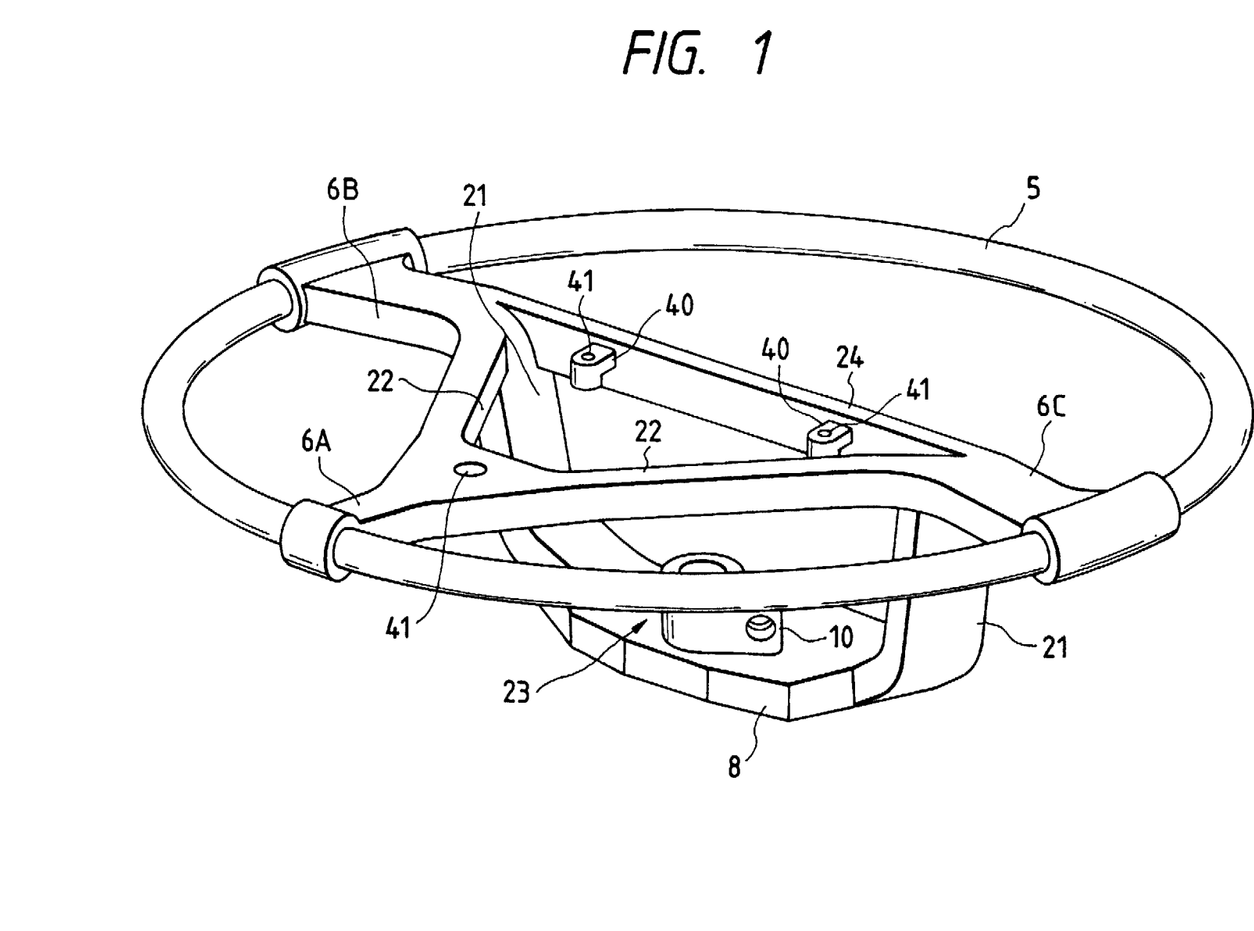
FIG. 1 is a perspective view of a metal core structure of a steering wheel according to an embodiment of the invention.

On the other hand, in the present embodiment, the boss 8 is formed integrally with the steering wheel main body 1. That is, as shown in FIG. 1, boss 8 is connected through a connecting part 21 to the two left and right metal spoke cores 6B and 6C. However, boss 8 is situated below both of the metal ring core 5 and the metal spoke cores 6B and 6C.

Also, the metal spoke cores 6B and 6C are connected through a sub-connecting part 22 to the remaining (the driver's side) spoke part core metal 6A, respectively. Due to this structure, the respective metal spoke cores 6A–6C, metal ring core 5 and boss 8 are connected together strongly and, at the same time, the boss 8, connecting part 21 and sub-connecting part 22 cooperate in forming a relatively large opening 23 on the driver's seat side of boss 8. Also, the metal spoke cores 6B and 6C are connected to each other by a support bar 24, which assures the stability of the air bag 14 when it is inflated. Incidentally, the reference numeral 40 designates bag holder fixing protrusions in which threaded holes 41 are formed for fixing the bag holder 16 by bolts 17.

Further, in the present embodiment, a lower cover (not shown) formed of resin is arranged in such a manner that it encloses the lower side of the steering wheel main body 1.

Next, description will be given of the procedure for mounting the steering wheel W onto the steering shaft 30.

Figure 5:
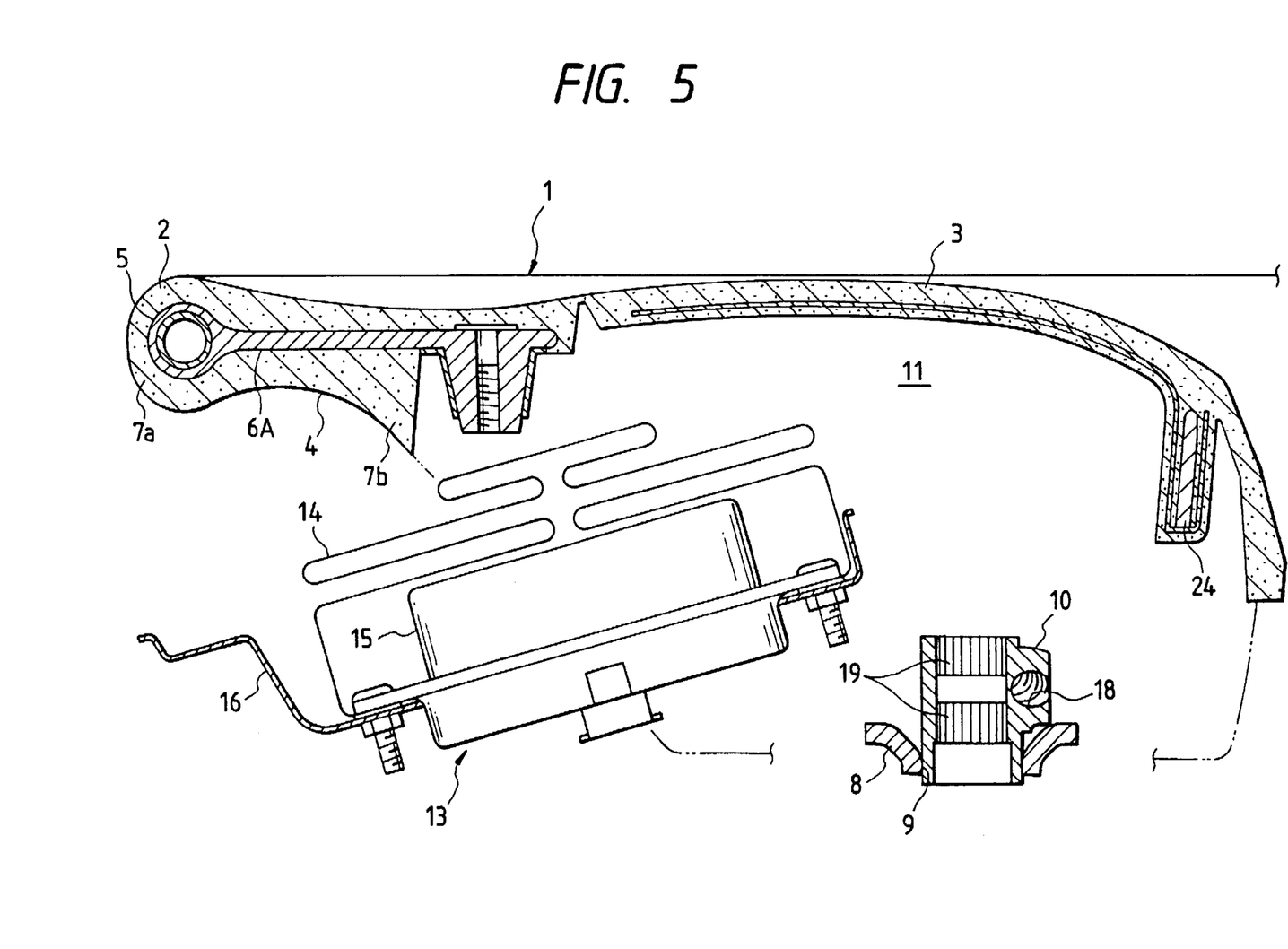
FIG. 5 is a sectional view of a steering wheel main body showing the air bag device mounting operation.

At first, as shown in FIG. 5, the membrane switch and air bag device 13 are inserted from the opening 23 defined by the boss 8, connecting part 21 and sub-connecting part 22. Bag holder 16 of the air bag device 13 is fixed to the metal spoke core 6A with a screw 17 and to the other fixing protrusions 40 with screws 17 within threaded holes 41. In this operation, since the opening 23 is formed comparatively large, the air bag device 13 can be easily inserted through the opening 23 and mounted onto the interior of the steering wheel main body 1.

Next, as shown in FIG. 6, the boss 8, adapter 10, together with the steering wheel main body 1 united integrally therewith are inserted onto the top end of the steering shaft 30. At the same time, the serrated portions 31 of the steering shaft 30 are brought into meshed engagement with the serrated portions 19 formed in the adapter 10. Then, the bolt 33 is threadedly engaged into the bolt hole 18 formed in the adapter 10, thereby fixing the boss 8 to the steering shaft 30. Because the steering wheel main body 1, via metal spoke cores 6B and 6C, is connected to the boss 8 through the connecting parts 21, by fixing the boss 8 to the steering shaft 30, the steering wheel main body 1 including the air bag device 13 can also be fixed at the same time.

Figure 7:
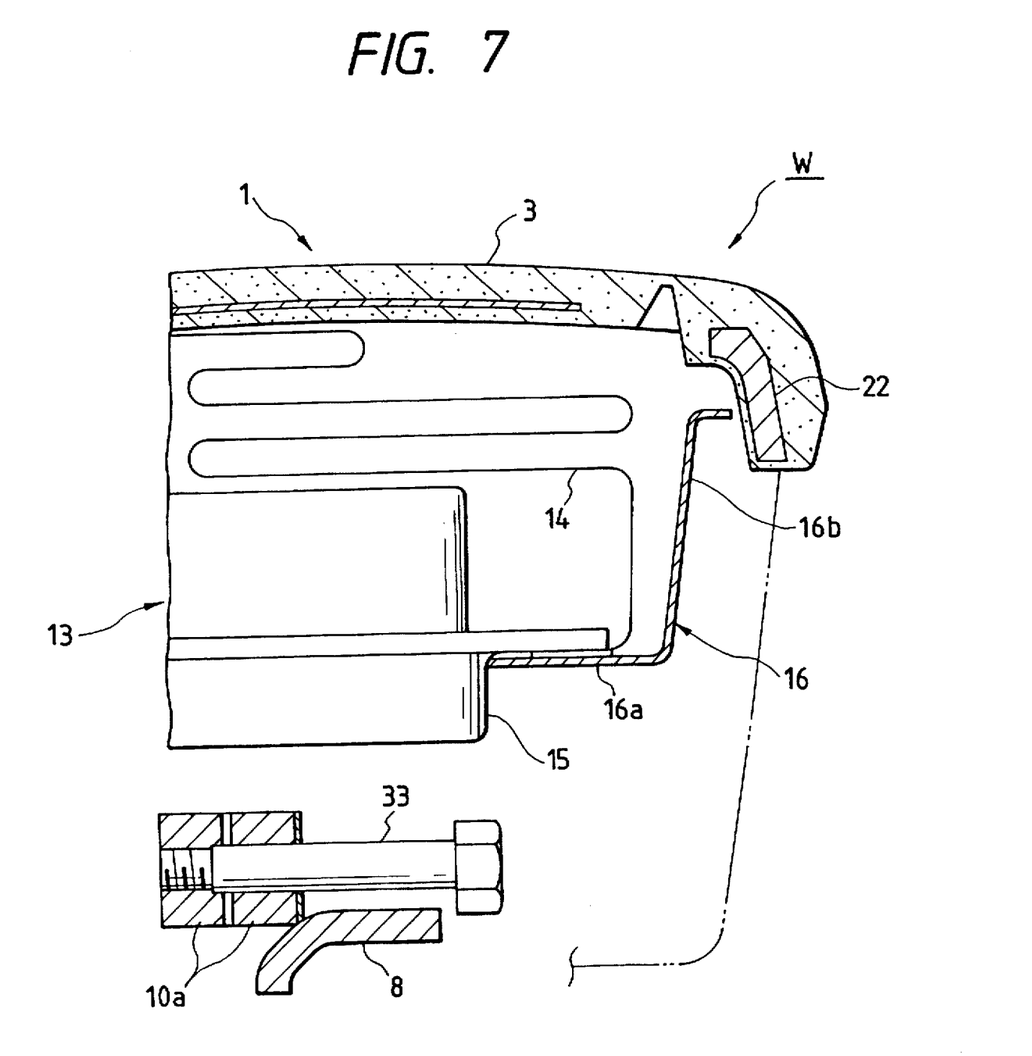
FIG. 7 is a sectional view taken along the line A—A shown in FIG. 3.

As has been described heretofore, according to the present embodiment, as shown in FIG. 1, the metal spoke cores 6B and 6C are integrally connected to the boss 8 through the connecting part 21. Also, the boss 8 is structured such that it is situated below both the metal ring core 5A and metal spoke cores 6A–6C, while the metal spoke cores 6B and 6C are connected to the boss 8 via connecting parts 21, as well as to the remaining spoke part core metal 6A by use of the sub-connecting parts 22 to thereby form the opening 23, respectively. Hereupon, as shown in FIGS. 2 and 7, adjacent to and outside the upper portion of the cylindrical portion 16b of the bag holder 16 according to the present embodiment, there are provided sub-connecting parts 22 and a support bar 24.

Next, description will be given below of the operation and effects of a steering wheel W having the above-mentioned structure.

Due to this structure, since the air bag device 13 can be inserted through the opening 23, the air bag device 13 can be easily interposed between the pad 3 and boss 8. That is, according to the present embodiment, the air bag device 13 can be moved into position through the opening 23 which has a relatively wide area, the assembling operation of the steering wheel W can be completed. Therefore, in assembling the steering wheel W, the operation efficiency is greatly enhanced.

Even when the steering wheel is structured such that it has the opening 23 formed in the above-mentioned manner, not only can the boss 8 can be strongly connected to the two left and right racial spoke cores 6B and 6C through the connecting part 21, but also the respective metal spoke cores 6B and 6C can be strongly connected to the remaining (driver's side) metal spoke core 6A through the sub-connecting part 22. Thanks to this, the metal spoke cores 6A–6C, metal ring core 5 and boss 8 are strongly connected to one another. Therefore, the steering wheel W can be assembled with sufficient stability as a whole.

Further, according to the present embodiment, the two metal spoke cores 6B and 6C, respectively, extend from the two sides of the steering wheel and are connected to the boss 8 by use of the connecting part 21. Due to this, the metal spoke core 6B, 6C, connecting part 21 and boss 8, when they are viewed from top, are situated substantially on the same straight line, which increases the structural strength of the steering wheel.

Figure 8:
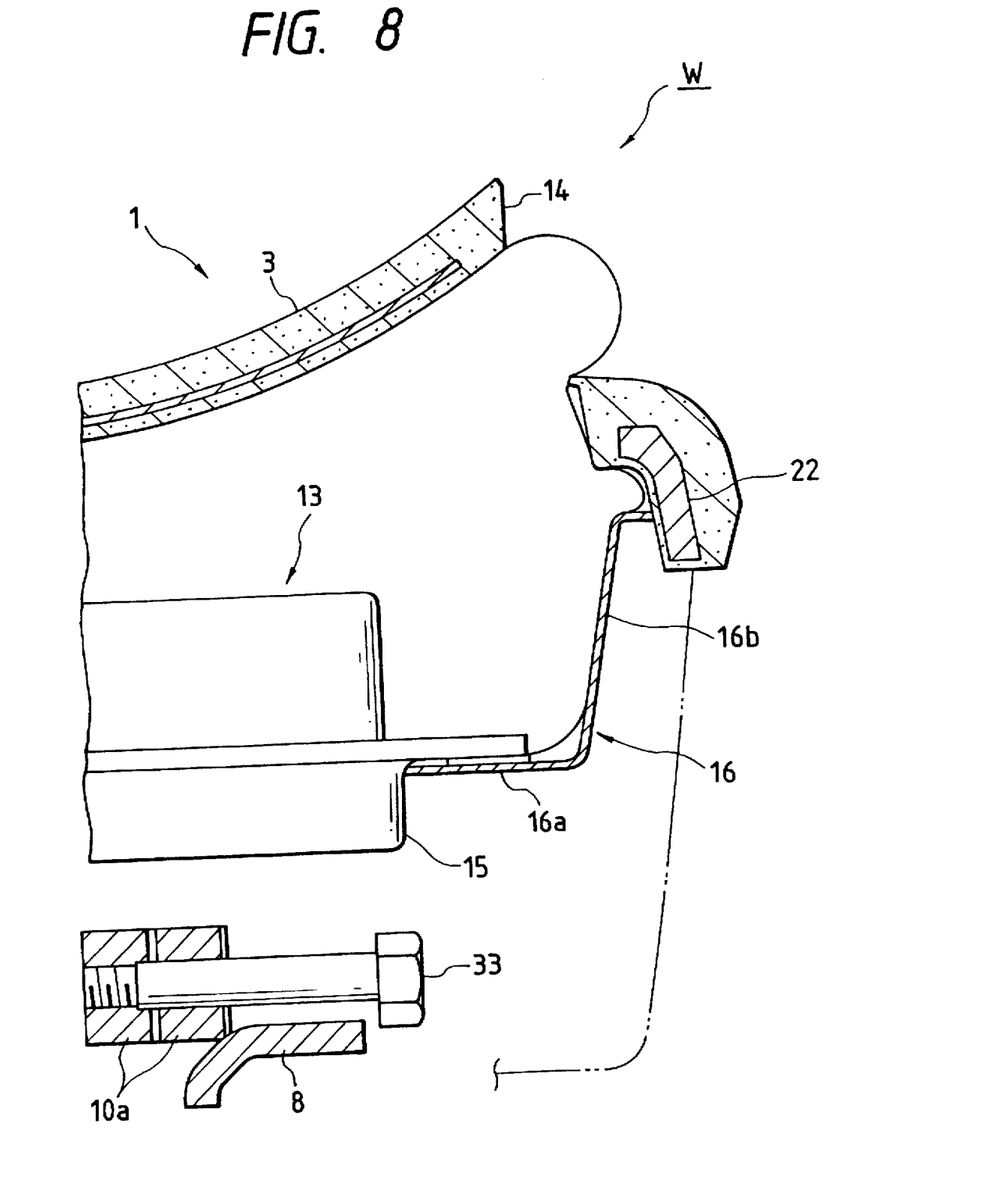
FIG. 8 is a sectional view of a steering wheel, showing the operation to inflate an air bag.

When a given deceleration is detected, gas is generated instantaneously from the inflator 15 and is supplied into the air bag 14. As a result of this, as shown in FIG. 8, the air bag 14 is inflated to thereby spread out the pad 3. At the same time, while the base end portion of the air bag 14 is held by the bag holder 16, the cylindrical portion 16b of the bag holder 16 receives from the air bag 14 an outwardly directed stress when the air bag 14 is inflated.

However, according to the present embodiment, there are provided the sub-connecting part 22 and support bar 24 which connect the metal spoke cores 6A, 6B, 6C to one another adjacent to and outside the upper end portion of the cylindrical portion 16b. Due to this, the upper end portion of the cylindrical portion 16b of the bag holder 16 is supported by the respective central portions of the side surfaces of the sub-connecting part 22 and support bar 24, which prevents the cylindrical portion 16b of the bag holder 16 from being deformed any further. Therefore, the deformation of the bag holder 16, and cylindrical portion 16b, can be minimized to thereby eliminate the possibility that the air bag 14 can escape in the lateral direction. This assures the stabilized spreading-out of the air pad 3 as well as the inflation of the air bag 14. As a result of this, the operation stability of the air bag device can be enhanced further.

In particular, according to the present embodiment, the sub-connecting part 22 and support bar 24 are situated adjacent to and outside that portion of the bag holder 16 which gives the largest amount of displacement when the air bag 14 is inflated (e.g., the upper end portion of the cylindrical portion 16b). Thanks to this, the deformation of the bag holder 16 can be decreased further, so that the above-mentioned effect can be obtained more positively.

The invention is not limited to the above-mentioned embodiment and the following embodiments are also possible.

Figure 9:
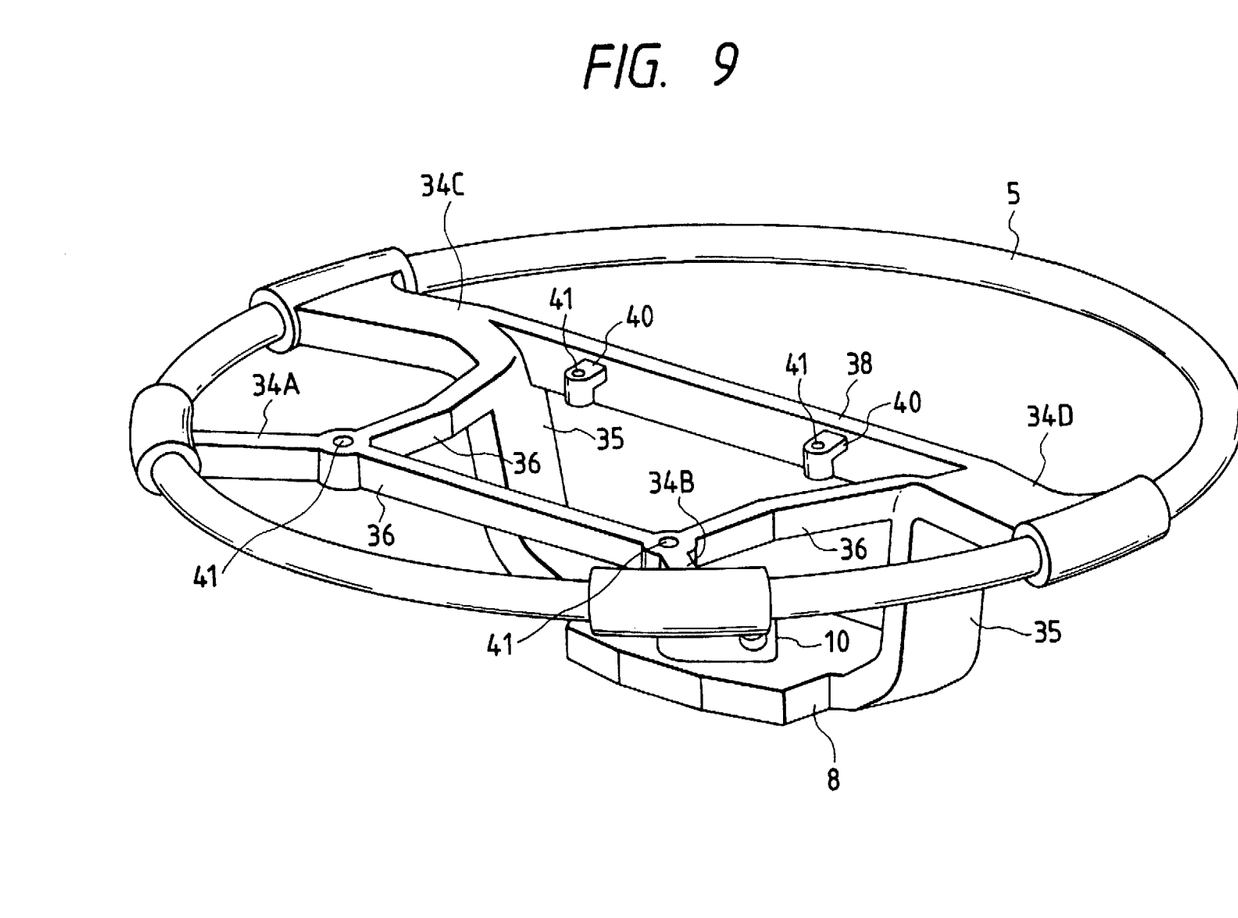
FIG. 9 is a perspective view of a metal core structure employed in another embodiment of the invention.

In the above-mentioned embodiment, the invention is embodied as the steering wheel W which includes the three spoke parts 4 and the metal spoke cores 6A–6C. However, the invention can also be embodied as another type of steering wheel which, for example, as shown in FIG. 9, includes four metal spoke cores 34A, 34B, 34C and 34D and a support bar 38 that interconnects spoke cores 34C and 34D. In this embodiment, for example, the boss 8 is connected to left and right metal spoke cores 34C and 34D respectively through connecting parts 35. However, similarly to the previously mentioned embodiment, the boss 8 is situated below the metal ring core 5 as well as the metal spoke cores 34A–34D and support bar 38.

Also, the metal spoke cores 34C and 34D are connected to the remaining (driver's side) metal spoke cores 34A and 34B through sub-connecting parts 36, respectively. Thanks to this, not only the metal spoke cores 34A–34D support bar 38, metal ring core 5 and boss 8 are strongly connected together, but also a relatively large opening 37 is created on the driver's side of the boss 8 by the connecting parts 35 and sub-connecting parts 36. As a result of this, there can be provided effects which are equivalent to the above-mentioned embodiment.

Furthermore, it is possible to further modify the embodiments of the present invention as follows.

The number of the spoke parts (metal spoke cores) is not limited to any special number but it may be 2 or more than 5, provided that the number is two or more.

In the illustrated embodiment, the air bag device 13 is fixed to the steering wheel main body 1 by use of the screw 17. Alternatively, however, it is also possible to use other types of fixing means such as a rivet, a clip or the like.

In the illustrated embodiment, the boss 8, which is united together with steering wheel main body 1, is fixed to the steering shaft 30 using the adapter 10, and bolt 33. However, the invention is not limited to this arrangement but, similar to a conventional steering wheel, the boss 8 can also be fixed using a nut.

In the illustrated embodiment, there are provided the sub-connecting part 22 and support bar 24 which connect the respective metal spoke cores 6A–6C to one another, and they are disposed in the neighborhood of the cylindrical portion 16b of the bag holder 16. However, it is not always necessary that all of the metal core connecting parts are disposed in this manner. Also, either of the sub-connecting part 22 or support bar 24 can be omitted.

The cross sectional shape of the sub-connecting part 22 and support bar 24 is not limited to the any specified shapes. However, it is preferable to adopt such a shape that it can support the bag holder 16 (the cylindrical portion 16b) with as large an area as possible.

In addition, various other modifications or variations may be made by those of ordinary skill in the art without departing from the scope of this invention which is defined by the appended claims.

What is claimed is:

1. A steering wheel with an air bag device comprising:
   a boss to be fixed to a steering shaft;
   a ring core;
   a first spoke core directly connected to said ring core and connected to said boss through a connecting part;
   a second spoke core connected to said metal ring core;
   a sub-connecting part interconnecting said first and second spoke cores, an opening being defined by said boss, said connecting part and said sub-connecting part;
   a cover member integrally covering said boss, said metal ring core, said first and second spoke cores and said sub-connecting part;
   said cover member including an integrally formed pad situated substantially in a central upper portion of said ring core; and
   an air bag device inserted through said opening and mounted to said steering wheel.

2. The steering wheel with an air bag device according to claim 1, wherein said first spoke core comprises two core members positioned on opposite sides of said ring core and two connecting parts which respectively are provided to extend from each of said two core members to said boss, and wherein said two core members, said boss and said two connecting parts are substantially aligned along a straight line.

3. The steering wheel with an air bag device according to claim 2, further including a support bar which directly interconnects said two core members.

4. The steering wheel with an air bag device according to claim 3, wherein said air bag device includes a bag holder, an inflator fixed to said bag holder and an air bag contained in said bag holder, and wherein said sub-connecting part and support bar engage said bag holder to prevent said bag holder from being deformed upon inflation of said air bag.

5. The steering wheel with an air bag device according to claim 4, wherein said sub-connecting part and support bar are disposed outside of at least those portions of said bag holder which will have the largest displacement upon inflation of said air bag.

6. A steering wheel with an air bag device comprising:
   a boss to be fixed to a steering shaft;
   a ring core;
   at least two spoke cores connected to said boss and said ring core;
   a sub-connecting part which connects said at least two spoke cores to said boss; and
   a cover member covering said boss, said ring core, said at least two spoke cores and said sub-connecting part;
   said cover member including an integrally formed pad situated substantially in a central upper portion of said ring core; and
   an air bag device mounted to said steering wheel and within said sub-connecting part, said air bag device including a bag holder, an air bag and an inflator mounted to said bag holder;
   wherein said sub-connecting part prevents said bag holder from being deformed upon inflation of said air bag.

7. The steering wheel with an air bag device according to claim 6, wherein said sub-connecting part is disposed about an outside portion of said bag holder which shows a largest displacement amount upon inflation of said air bag.

8. The steering wheel with an air bag device according to claim 6, wherein said bag holder includes an upwardly extending cylindrical portion defining a peripheral portion thereof, said cylindrical portion including an upper end portion disposed inside said sub-connecting part.

9. The steering wheel with an air bag device according to claim 6, wherein an opening is defined by said boss and sub-connecting part, and said air bag device is inserted through said opening and mounted to said steering wheel.

10. The steering wheel with an air bag device according to claim 6, wherein said at least two spoke cores includes two first spoke core members which are connected to said ring core directly and to said boss through a connecting part; and     a second spoke core which is not connected to said ring core; and wherein said sub-connecting part interconnects said first spoke core members and said second spoke core; and further including a support bar which directly interconnects said two first spoke core members with each other.

* * * * *